(12) United States Patent
Segard

(10) Patent No.: US 9,334,003 B2
(45) Date of Patent: May 10, 2016

(54) ROAD TRAILER WITH ORIENTABLE SECONDARY WHEELSET

(71) Applicant: Jean-Baptiste Segard, Saint Germain en Laye (FR)

(72) Inventor: Jean-Baptiste Segard, Saint Germain en Laye (FR)

( * ) Notice: Subject to any disclaimer, the term of this patent is extended or adjusted under 35 U.S.C. 154(b) by 0 days.

(21) Appl. No.: 14/380,218

(22) PCT Filed: Mar. 8, 2013

(86) PCT No.: PCT/IB2013/051864
§ 371 (c)(1),
(2) Date: Aug. 21, 2014

(87) PCT Pub. No.: WO2013/132468
PCT Pub. Date: Sep. 12, 2013

(65) Prior Publication Data
US 2015/0035252 A1    Feb. 5, 2015

(30) Foreign Application Priority Data
Mar. 9, 2012    (FR) ...................................... 12 52169

(51) Int. Cl.
| B60P 1/02 | (2006.01) |
| B62D 61/12 | (2006.01) |
| A01B 63/16 | (2006.01) |
| A01B 63/12 | (2006.01) |
| B60S 9/14 | (2006.01) |
| B62D 13/02 | (2006.01) |
| B62D 13/06 | (2006.01) |
| B60D 1/173 | (2006.01) |
| B60D 1/24 | (2006.01) |
| B60D 1/30 | (2006.01) |

(Continued)

(52) U.S. Cl.
CPC ................ *B62D 61/12* (2013.01); *A01B 63/12* (2013.01); *A01B 63/16* (2013.01); *B60D 1/173* (2013.01); *B60D 1/245* (2013.01); *B60D 1/30* (2013.01); *B60D 1/62* (2013.01); *B60P 1/025* (2013.01); *B60S 9/00* (2013.01); *B60S 9/14* (2013.01); *B62D 13/025* (2013.01); *B62D 13/06* (2013.01)

(58) Field of Classification Search
CPC ........ A01B 63/12; A01B 63/16; B60P 1/025; B60D 13/04; B60D 13/00
USPC ........................ 280/414.5, 412, 444, 445, 448
See application file for complete search history.

(56) References Cited

U.S. PATENT DOCUMENTS

| 2,433,269 A | 12/1947 | Fellabaum |
| 2,662,781 A | 12/1953 | Hopson |

(Continued)

FOREIGN PATENT DOCUMENTS

| FR | 2831512 A1 | 5/2003 |
| WO | 0056588 A1 | 9/2000 |
| WO | 2011031916 A2 | 3/2011 |

*Primary Examiner* — Joseph Rocca
*Assistant Examiner* — Marlon Arce
(74) *Attorney, Agent, or Firm* — William H. Eilberg

(57) ABSTRACT

A road trailer (1) includes, under a chassis (2) with fixed draw bar (4), a main wheelset (3) and a secondary wheelset (6). A retraction device (M, V, 6d) allows the wheelset (6) to be moved in such a way that the trailer (1) rests on the ground (S) selectively either via the main wheelset (3) or via the secondary wheelset (6). An orientation device allows the secondary wheelset (6) to have its direction oriented according to a reversing path followed by a towing vehicle (5) to which the trailer (1) is hitched. Orienting the secondary wheelset (6) allows the trailer (1) to be kept always along the axis of the towing vehicle (5) during reversing.

14 Claims, 14 Drawing Sheets

(51) Int. Cl.
  *B60D 1/62* (2006.01)
  *B60S 9/00* (2006.01)

(56) References Cited

U.S. PATENT DOCUMENTS

| | | | |
|---|---|---|---|
| 2,717,787 A | 9/1955 | Ward | |
| 2,764,424 A | 9/1956 | Standing | |
| 4,383,698 A | 5/1983 | Felburn | |
| 4,415,174 A * | 11/1983 | Koehn | 172/314 |
| 4,589,670 A | 5/1986 | Sweetin | |
| 4,635,742 A * | 1/1987 | Bertolini | 180/209 |
| 4,938,295 A * | 7/1990 | Marrandi et al. | 172/313 |
| 5,232,054 A * | 8/1993 | Van Blaricon et al. | 172/311 |
| 5,579,849 A * | 12/1996 | Houck | 172/456 |
| 5,823,558 A * | 10/1998 | Shoquist | 280/405.1 |
| 6,450,522 B1 * | 9/2002 | Yamada et al. | 280/414.5 |
| 6,604,753 B1 * | 8/2003 | Boyd | 280/426 |
| 8,716,889 B2 * | 5/2014 | Vaidyanathan | 307/43 |
| 2013/0214510 A1 * | 8/2013 | Bartlett | 280/414.5 |

\* cited by examiner

ROAD TRAILER WITH ORIENTABLE SECONDARY WHEELSET

TECHNICAL FIELD OF THE INVENTION

The present invention relates to devices used for easily maneuvering in reverse gear a towing vehicle to which a trailer is hitched.

When a trailer is hitched to a towing vehicle, the trailer is articulated in terms of its orientation and generally follows the towing vehicle without any difficulty when the latter is moving in the normal direction of forward travel.

However, when the tractor vehicle is backing up, the articulation of the trailer with respect to the towing vehicle makes maneuvering complicated and entails learning a particular driving skill, of the type employed when driving a truck and semitrailer, using opposite lock to begin changes in direction, and careful control of the steering angle in order to avoid jack-knifing.

A great many users have not been taught this skill, which means that they find driving in reverse difficult.

This difficulty arises for example if there is a desire to couple to an electrically powered towing vehicle a trailer carrying an auxiliary electrical-power producing source that will allow the range of the vehicle to be extended. Such an application of a trailer is described for example in document WO 2011/031916 A2. That document does not describe any solution for making the coupling easier to maneuver in reverse gear.

Document FR 2 831 512 has already proposed locking the drawbar system that couples a towing vehicle to its semi-trailer when reversing. This solution is satisfactory when reversing in a straight line, but is not suitable for reversing around a corner.

Document WO 00/56588 proposes a trailer in which the drawbar can be immobilized along the axis of the towing vehicle and the wheels of the trailer can be freed to steer, when reversing. When moving forward, the wheels need to be reliably prevented from steering and the drawbar needs to be unimmobilized in order to allow pivoting under cornering. However, this solution carries the danger of defective immobilization when moving forward, and this would lead to abnormal and dangerous behavior of the vehicle and of the trailer under cornering.

Documents U.S. Pat. No. 4,383,698 A, U.S. Pat. No. 2,433,269 A, U.S. Pat. No. 2,662,781 A and U.S. Pat. No. 2,717,787 A describe other road trailer structures comprising a rear wheelset with fixed axial orientation and a front wheelset that can be oriented by means of connection to a towing vehicle. These trailers permanently rest on the ground via both wheelsets and do nothing to make maneuvering of the coupled assembly easier in reverse.

Document U.S. Pat. No. 4,589,670 A also describes a road trailer with a rear wheelset of fixed orientation and an orientable front wheelset, the front wheelset also being raisable. The trailer thus rests on the ground either via both wheelsets or via its fixed orientation rear wheelset alone, and this does nothing to make backing-up maneuvers easier.

DESCRIPTION OF THE INVENTION

The problem proposed by the invention is that of designing a new trailer drawbar structure which makes moving in reverse easier, without the need to apply opposite lock, and without the risk of allowing the trailer to deviate from the path of the vehicle and to jack-knife.

In particular, the invention seeks to allow maneuvers in reverse in the case of compact trailers which are impossible or difficult for the driver to see from the driving position of the towing vehicle.

At the same time, the invention seeks to maintain the behavioral stability that a conventional trailer structure has when moving forward.

In order to achieve these and other objectives, the invention proposes a road trailer provided with a trailer chassis, with a main wheelset and with a fixed drawbar device for coupling it to a towing vehicle and further comprising:
  a secondary wheelset,
  retraction means for selectively moving, out of the main wheelset and the secondary wheelset, at least one of them between a first position in which the secondary wheelset is retracted away from the ground with respect to the main wheelset so that the secondary wheelset remains away from the ground when the trailer is resting on the ground via the main wheelset, and a second position in which the secondary wheelset is deployed toward the ground past the main wheelset so that the main wheelset remains away from the ground when the trailer is resting on the ground via the secondary wheelset,
  orientation means for orienting the direction of the secondary wheelset according to a reversing path of the towing vehicle.

In that way, when moving forward, the trailer is used running on its main wheelset alone, which behaves in the satisfactory usual way of a conventional trailer.

In reverse gear, it is the secondary wheelset alone that is used and this, because of the orientation means, causes the trailer to move in the desired direction in order to maintain satisfactory alignment between the towing vehicle and the trailer, avoiding any risk of the trailer deviating from the path of the towing vehicle and jack-knifing. There is therefore no need to apply opposite lock in order to begin the changes in orientation in reverse gear.

With this combination, the trailer is provided with two separate wheelsets. The main wheelset may comprise one or more axles, preferably with fixed rotation axis, and is used when moving forward. The secondary wheelset, the direction of which is orientable, is used when reversing. When moving forward, the main wheelset rests on the ground and the secondary wheelset is retracted away from the ground. When reversing, the secondary wheelset rests on the ground, and the main wheelset is at least slightly held away from the ground, its wheels being slightly off the ground. The direction followed by the trailer and the orientation of the secondary wheelset are therefore connected.

Each wheelset thus has a single function and can be engineered to suit its specific use.

Thus, when moving forward, the speed may be high and require good roadholding, this being provided by the main wheelset.

In reverse, the speeds and distances covered are small, but the steering angle may be great, and there is no need for suspensions for the secondary wheelset.

The fact of providing two separate wheelsets greatly reduces the risk of accidents associated with a breakdown or unforeseen fault with the system.

Specifically, when moving forward, the trailer is fundamentally an entirely conventional trailer. An advantage is that the secondary wheelset may be made up of components that are highly economical, because it is used at low speeds and over short distances.

For preference, the main wheelset is at a fixed height with respect to the chassis, while the retraction means are designed to move the secondary wheelset between a position retracted toward the upper part of the chassis, in which position the trailer rests on the ground via the main wheelset and a position deployed away from the upper part of the chassis, in which position the trailer rests on the ground via the secondary wheelset whereas the main wheelset is away from the ground.

In this way, the normal structure of a road trailer is maintained, as is its ability to run in a stable manner when moving forward on its main wheelset.

According to a first embodiment, in order to create the orientation means, i.e. in order to orient the direction of the secondary wheelset:

the drawbar device comprises means that limit the angular deviation between the longitudinal direction of the trailer and the longitudinal direction of the towing vehicle, the secondary wheelset is made up of one or more self-orienting wheels able to follow the direction imparted to the road trailer by the drawbar device attached to the towing vehicle.

This embodiment is particularly simple and inexpensive, the self-orienting wheels constituting a particularly simple and commonplace structure, for example like those used on supermarket shopping carts.

In a way that is also simple, the means that limit the angular deviation may comprise at least one or more clamping jaws able to press around a towing ball provided on the towing vehicle. The clamping leads to friction, namely to a torque that brakes the angular orientation between the drawbar and the towing vehicle, thus sufficiently limiting the angular deviation.

As an alternative, the means that limit the angular deviation may comprise locking means for selectively locking the angular deviation of the drawbar device with respect to the towing vehicle.

As a result of the locking or braking of the angular deviation, the path followed by the trailer is determined by that of the towing vehicle in so far as the self-orienting wheels allow the trailer to follow this path freely.

According to a second embodiment, for producing the orientation means, i.e. for orienting the direction of the secondary wheelset:

the secondary wheelset is made up of wheels, the direction of which can be oriented, actuating means control the orientation of the orientable wheels with respect to the chassis of the road trailer as a function of the angular deviation between the longitudinal direction of the towing vehicle and of the longitudinal direction of the trailer.

This embodiment is more reliable and more effective for moving in reverse, notably over uneven or banked ground that is likely to apply transverse loadings to the secondary wheelset.

In this case, the actuating means may orient the wheels of the secondary wheelset at a steering angle that tends to bring the trailer back into line with the axis of the towing vehicle.

In practice, the actuating means may comprise cables or link rods a front end of which is articulated to the towing vehicle and a rear end of which is articulated to a common orientable support for the wheels of the secondary wheelset.

As an alternative, the actuating means may comprise cables or link rods of which a front end is articulated to the towing vehicle and of which a rear end is articulated to a rotary plate operating a transverse steering arm connected by link rods to the wheels of the secondary wheelset.

In all the embodiments, the retraction means may comprise:

at least one actuator able selectively to move at least one out of the main wheelset and the secondary wheelset, actuator control means for actuating the actuator and causing the trailer to rest on the ground via the secondary wheelset alone when the towing vehicle is reversing, and for actuating the actuator and causing the trailer to rest on the ground by the main wheelset alone when the towing vehicle is moving forward.

The actuator control means may be manual control means, for example a cranking handle. For preference, the actuator control means may be motorized means, driven by a sensor that detects the movement of the towing vehicle, namely whether it is moving forward or backward, or whether it is making ready to move forward or to move backward.

According to one embodiment of the invention, it is possible to benefit from the presence of two wheelsets in order to give the road trailer greater stability when parked without the towing vehicle. To do so, wheelset locking means may be provided for selectively locking the retraction means in an intermediate position in which the main wheelset and the secondary wheelset are at the same level so that they simultaneously support the road trailer on the ground, the main and secondary wheelsets being offset from one another in the longitudinal direction of the road trailer.

According to one advantageous embodiment, a road trailer according to the invention may comprise electricity generation or storage means able themselves to be connected to an electrically powered towing vehicle so as to supply the towing vehicle with electrical energy thus increasing the range thereof.

In that case, an electrical energy supply trailer can easily be coupled in order to extend the range of a towing vehicle without the driver needing to have the special skills required for driving in reverse with an articulated trailer.

According to another aspect, the invention proposes the use of a road trailer as defined hereinabove with a towing vehicle, in which use:

when the towing vehicle is moving forward, the retraction means are operated in order to place the main and secondary wheelsets in the first position so that the road trailer rests on the ground via its main wheelset alone, when the towing vehicle is reversing, the retraction means are operated in such a way as to place the main and secondary wheelsets in a second position so that the road trailer rests on the ground via its secondary wheelset alone.

In such a use, provision may also be made for the towing vehicle to comprise electrical propulsion means and for the road trailer to comprise electricity generation or storage means connected to the towing vehicle and powering the electric propulsion means in order to increase the range of said vehicle.

BRIEF DESCRIPTION OF THE DRAWINGS

Further objects, features and advantages of the present invention will become apparent from the following description of some particular embodiments which is given in conjunction with the attached figures amongst which.

DESCRIPTION OF THE PREFERRED EMBODIMENTS

Figure 1:
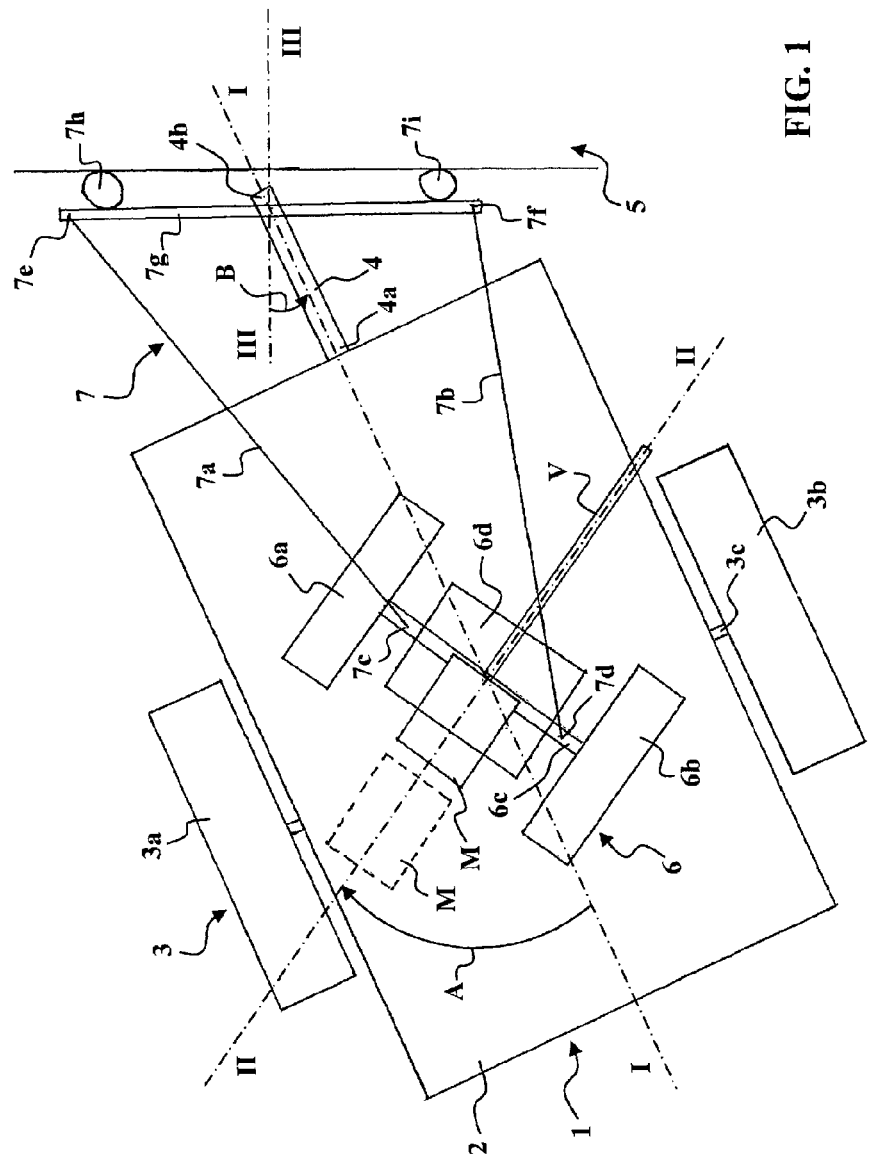
FIG. 1 is a schematic view from beneath of a trailer according to one embodiment of the present invention, the trailer deviating laterally from the towing vehicle.

In all the embodiments illustrated in the figures, a road trailer 1 according to the invention comprises, in the known way, a trailer chassis 2, a main wheelset 3 and a drawbar device 4 for attaching to a towing vehicle 5.

These embodiments cover trailers 1 the main wheelset 3 of which comprises two main wheels 3a and 3b which are mounted at the ends of a transverse main axle 3c arranged at an intermediate position below the chassis 2 of the trailer 1.

The drawbar device 4 is secured to the chassis 2 at its rear end 4a while its front end 4b is designed to be articulated to the towing vehicle 5 in a known way. For example, the front end 4b of the drawbar device 4 may comprise a lower housing that collaborates with a towing ball mounted at the rear of the towing vehicle 5.

As is usual, the drawbar device 4 may for example take the form of a longitudinal beam or of a draw bar.

Figure 3:
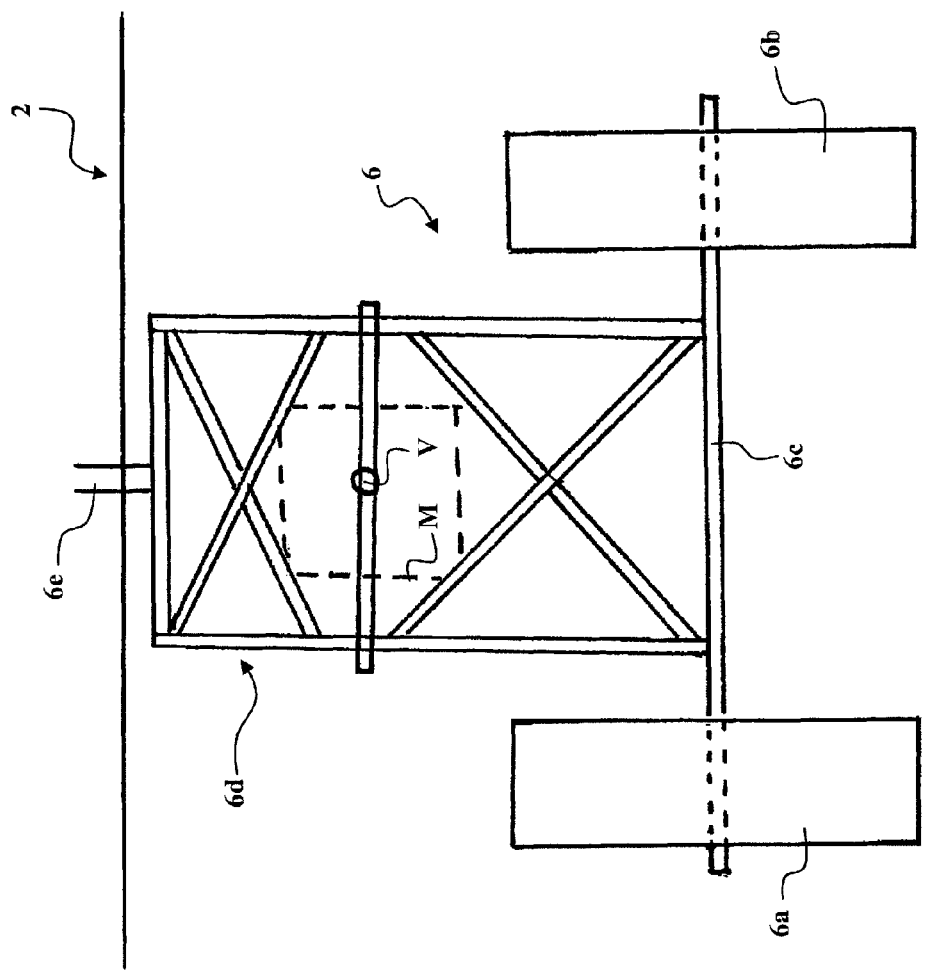
FIG. 3 schematically illustrates face on one embodiment of the secondary wheelset and of the means of connecting it to the chassis of the trailer.

As can be seen in FIG. 1 which is a view from beneath, the road trailer 1 according to the invention further comprises a secondary wheelset 6. This secondary wheelset 6, in the embodiment of this figure, comprises two coaxial secondary wheels 6a and 6b which are mounted at the ends of a secondary axle 6c itself mounted on a secondary chassis 6d better visible in the face-on view of FIG. 3. The secondary chassis 6d is itself mounted to pivot freely under the chassis 2 by a kingpin 6e or vertical pivot pin.

The secondary chassis 6d is deformable to allow the secondary wheelset 6 to move selectively toward and away from the chassis 2 of the trailer 1.

Figure 2:
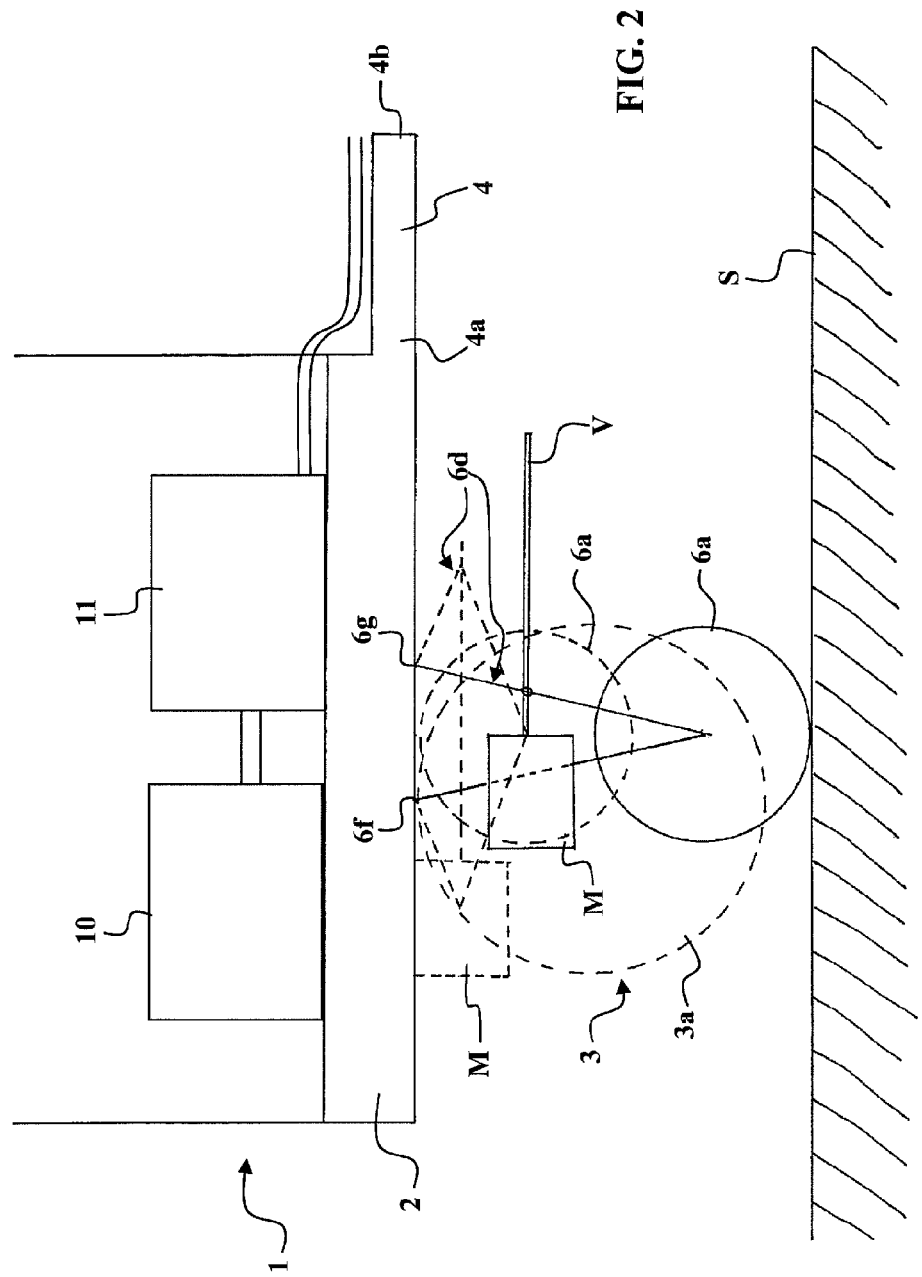
FIG. 2 is a schematic side view of the trailer of FIG. 1, in the position of operation of the secondary wheelset.

FIG. 2, which is a side view, illustrates the two extreme positions of the secondary wheelset 6, namely: a position retracted toward the upper part of the chassis 2, which position is illustrated in dotted line, and in which the secondary wheel 6a is away from the ground S and the trailer 1 can rest on the ground S via the main wheel 3a; and a position deployed away from the upper part of the chassis 2, which position is illustrated in solid line and in which the secondary wheel 6a is away from the chassis 2 and rests on the ground S while the main wheel 3a is away from the ground S.

In practice, in this embodiment, the secondary chassis 6d is a deformable parallelogram structure articulated under the chassis 2 at articulations 6f and 6g, the branches of which are acted upon by a motor M driving a screw V to cause the secondary wheelset 6 to move from the retracted position into the deployed position and vice versa.

In normal operation in forward travel, with the trailer 1 coupled to a towing vehicle 5, the secondary wheelset 6 is in the retracted position and the trailer rests on the ground S normally via the main wheelset 3 thereof, constituting a trailer 1 which operates in the usual way and offers the desired stability.

To make reversing maneuvers easier, the motor M is actuated and places the secondary wheelset 6 into the deployed position, the trailer 1 then resting on the ground S via the secondary wheelset 6 alone. In this case, the secondary wheels 6a and 6b need to adopt an appropriate direction consistent with the direction that the towing vehicle 5 is taking without the risk of the trailer 1 deviating from the longitudinal direction III-III of the towing vehicle 5.

To that end, orientation means allow the secondary wheelset 6 to be oriented in terms of direction according to the reversing path of the towing vehicle 5.

In the embodiment of FIG. 1, the orientation means for orienting the direction of the secondary wheelset 6 comprise, on the one hand, the fact that the secondary chassis 6d bearing the secondary wheelset 6 is articulated about the kingpin or vertical pivot pin 6e in such a way that the secondary wheels 6a and 6b can have their direction oriented; and the orientation means on the other hand comprise actuating means 7 for bringing about this orientation.

In practice, in this embodiment, the actuating means 7 comprise two link rods or cables 7a and 7b, articulated at their respective rear ends 7c and 7d to the secondary chassis 6d on either side of and equal distances away from the longitudinal axis II-II of the secondary chassis 6d, and articulated at their respective other, front, ends 7e and 7f to a crossmember 7g intended to be fixed with respect to the towing vehicle 5. For example, the crossmember 7g may be fixed to the towing vehicle 5 or may be articulated at its center to the drawbar device 4 and rest against the rear wall of the towing vehicle 5 with the interposition of elastic limit stops 7h and 7i.

The front ends 7e and 7f of the link rods or cables 7a and 7b are advantageously spaced further apart from one another than the rear ends 7c and 7d. In that way, the steering of the secondary wheels 6a and 6b is in some way amplified in the way that the present invention seeks to achieve, namely in the direction that brings the trailer 1 back into line with the axis of the towing vehicle 5.

Operation in reverse running is as follows: when the trailer 1 deviates angularly from the axis of the towing vehicle 5, namely when the longitudinal axis I-I of the trailer 1 makes a non-zero angle B with the longitudinal axis of the towing vehicle 5, the link rods or cables 7a and 7b cause the secondary wheelset 6 to pivot as illustrated in FIG. 1. In this way, as the towing vehicle 5 reverses, the secondary wheelset 6 immediately tends to bring the trailer 1 into line with the axis of the towing vehicle 5. In that way, whatever the path the towing vehicle 5 is going to follow in reverse gear, the secondary wheelset 6 and the actuating means 7 will, allow the trailer 1 to be brought onto a path compatible with that of the towing vehicle 5, preventing a large angle B from appearing between the axis I-I of the trailer 1 and the axis of the towing vehicle 5. The driver of the towing vehicle 5 does not therefore have to concern him or herself with the trailer 1 and can perform the usual maneuvers without applying opposite lock and without the risk of causing the trailer 1 to jack-knife with respect to the towing vehicle 5.

In order to resume movement in a forward direction, the motor M is made to turn and retracts the secondary wheelset 6 so that the trailer 1 rests on the ground S via the main wheelset 3 alone.

The secondary wheelset 6 is constantly being oriented even when the secondary wheelset 6 is in the retracted position. In this way, when the secondary wheelset 6 is lowered in order to perform reversing, the secondary wheels 6a and 6b of the secondary wheelset 6 are immediately oriented in the appropriate direction right from the start of the reversing maneuver.

The actuating means 7 orient the secondary wheelset 6 so that its longitudinal axis II-II makes, with the longitudinal axis I-I of the trailer, an angle A which is a function of the angle B between the longitudinal axis of the towing vehicle 5 and the longitudinal axis I-I of the trailer 1. The angle A increases in terms of absolute value as a function of the absolute value of the angle B, and is in the opposite direction to the angle B. For example, in FIG. 1, the angle B is in the counterclockwise direction whereas the angle A is in the clockwise direction.

Figure 4:
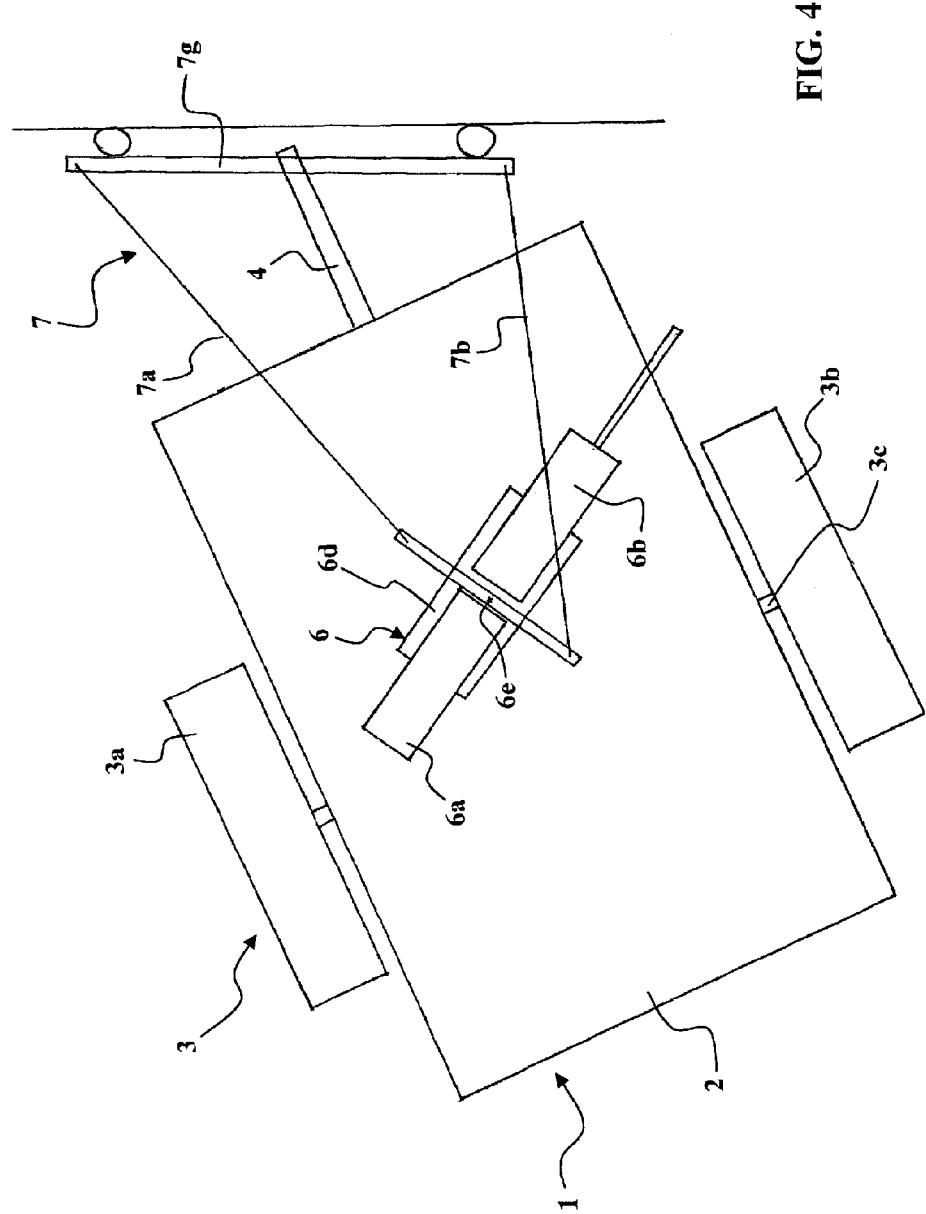
FIG. 4 is a schematic view from beneath of a trailer according to a second embodiment of the present invention, in a position that deviates laterally from the towing vehicle.
Figure 5:
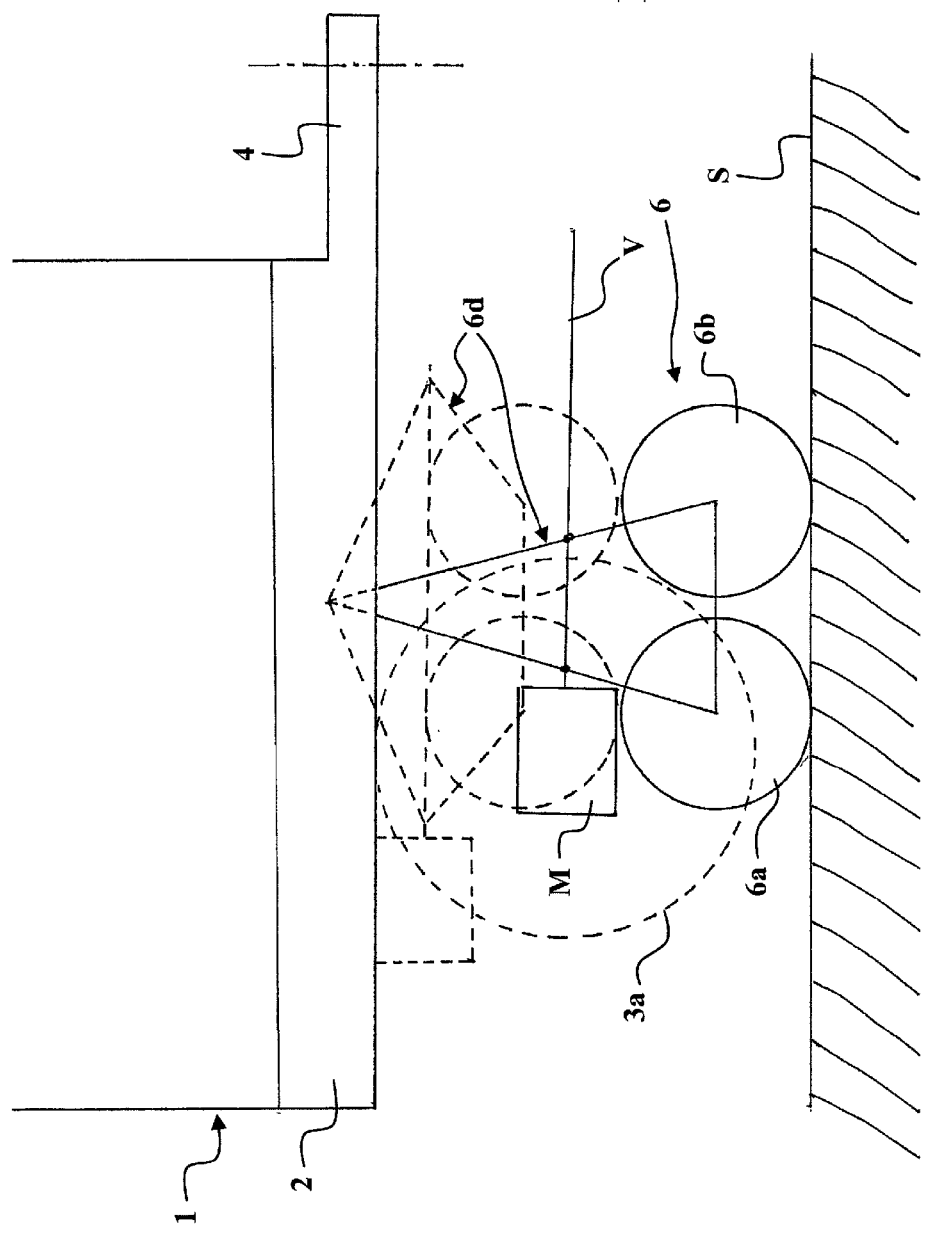
FIG. 5 is a schematic side view illustrating the trailer of FIG. 4, the secondary wheelset being in operation.
Figure 6:
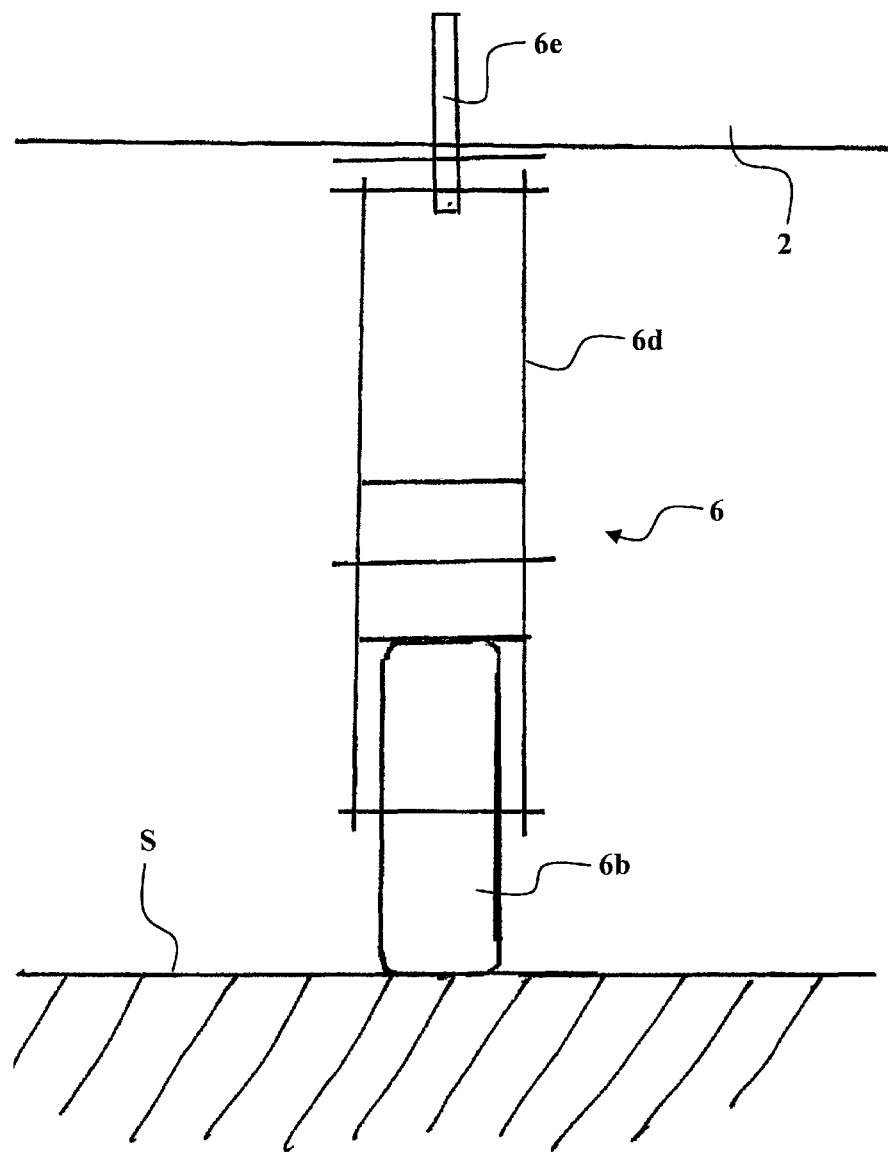
FIG. 6 schematically illustrates face on the secondary wheelset of the trailer of FIGS. 4 and 5.

Let us now consider the embodiment illustrated in FIGS. 4 to 6.

In this embodiment, we have the same structure of road trailer 1, with a chassis 2, a main wheelset 3 with two main wheels 3a and 3b at the end of a main axle 3c, and a drawbar device 4 fixed to the chassis 2.

We also again have a secondary wheelset 6 and actuating means 7 with link rods or cables 7a and 7b and a crossmember 7g.

The secondary wheelset 6 also comprises a secondary chassis 6d articulated to pivot freely about a kingpin 6e.

One difference is that in this second embodiment the secondary wheels 6a and 6b are aligned in tandem, offering better steering capability.

The secondary chassis 6d is also deformable, so that the secondary wheelset 6 can be retracted or deployed using a motor M and a screw V, which are better visible in FIG. 5.

Figure 7:
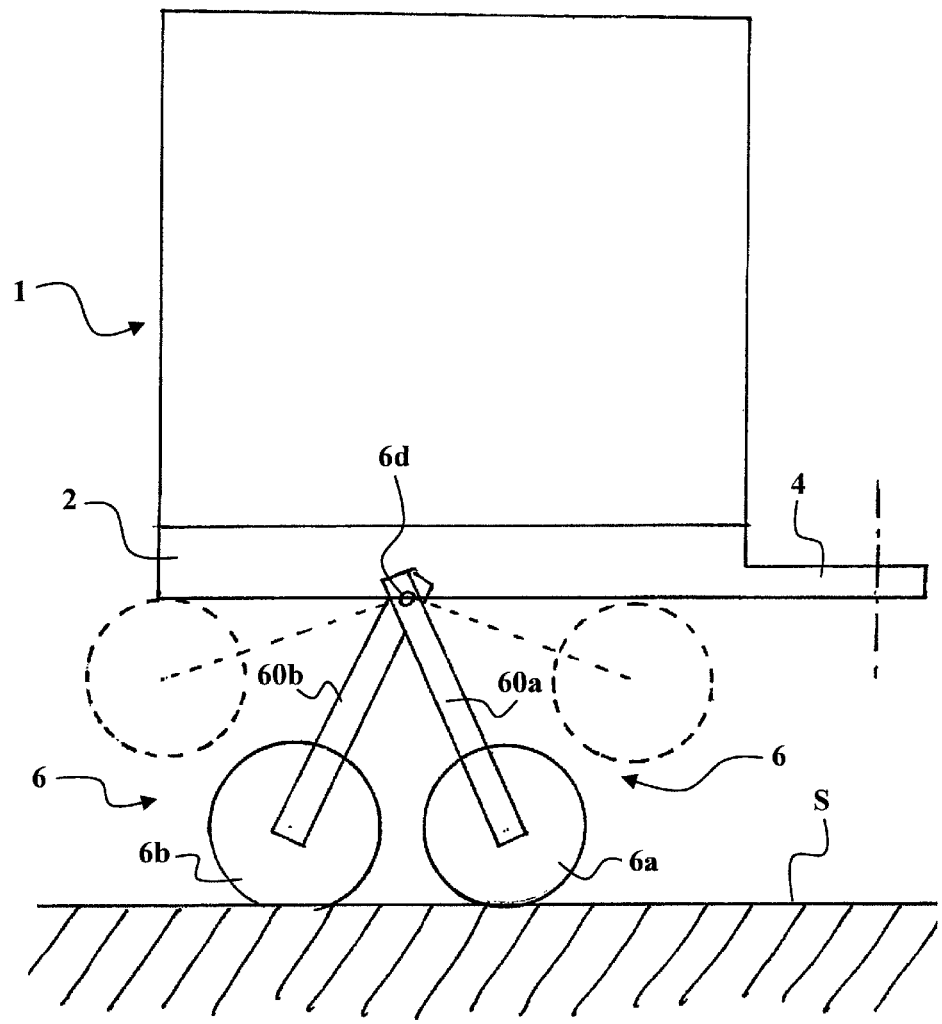
FIG. 7 schematically illustrates in side view a secondary wheelset according to an alternative form of the embodiment of FIGS. 4 to 6.

FIG. 7 illustrates an alternative form of the previous embodiment, in which the secondary wheels 6a and 6b are coplanar in tandem.

In this case, the wheels 6a and 6b are borne by respective link rods 60a or 60b which are articulated to the secondary chassis 6d in such a way as to be inclined in the longitudinal vertical plane of the trailer 1 between the retracted position (in dotted line) and deployed position (in solid line) of the secondary wheelset 6.

Figure 8:
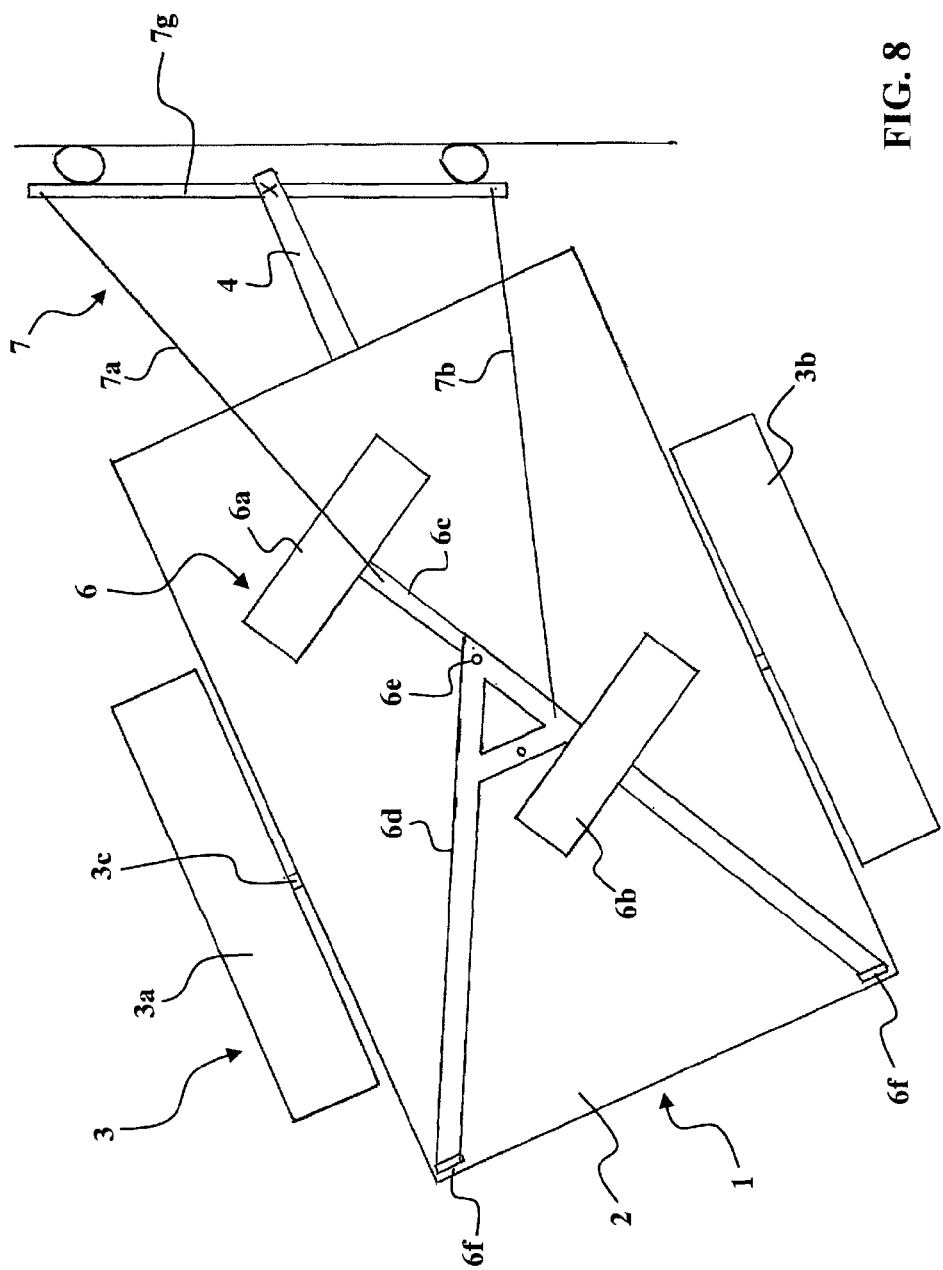
FIG. 8 is a view from beneath schematically illustrating a trailer according to another embodiment of the present invention.
Figure 9:
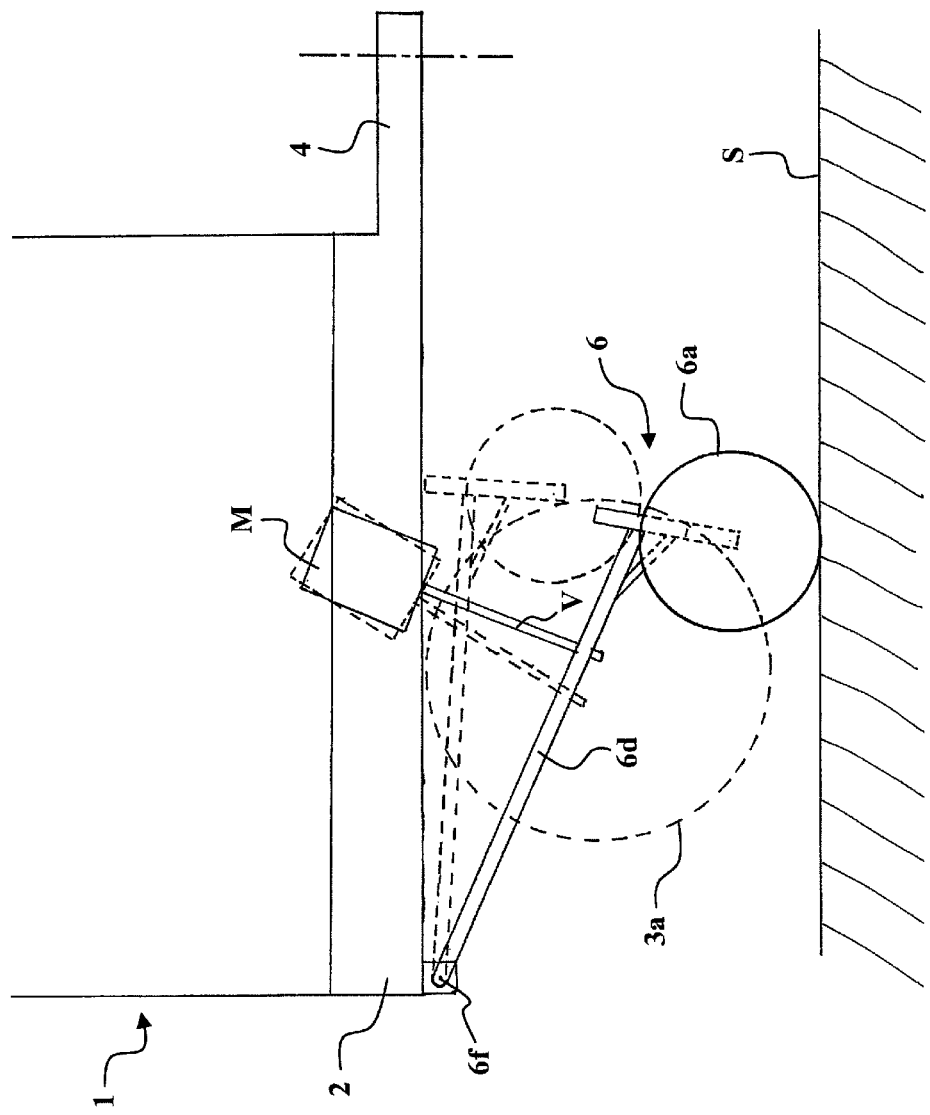
FIG. 9 is a side view schematically illustrating the trailer of FIG. 8, with the secondary wheelset being in operation.
Figure 10:
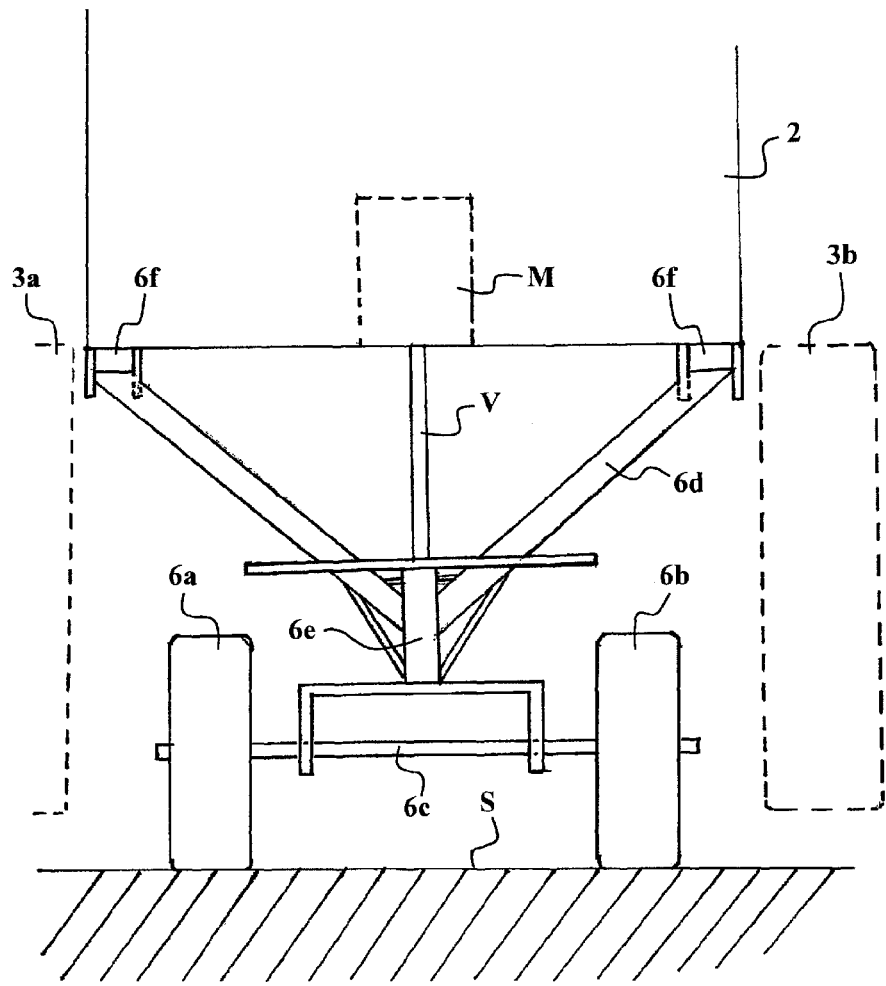
FIG. 10 is a face-on view schematically illustrating the secondary wheelset of FIG. 9.

Let us now consider the embodiment illustrated in FIGS. 8, 9 and 10.

In this embodiment, we find the same structure of trailer 1, with the chassis 2, a drawbar device 4 fixed to the chassis 2, a main wheelset 3 with two main wheels 3a and 3b on a main axle 3c.

We also again have a secondary wheelset 6, with two coaxial secondary wheels 6a and 6b at the end of a secondary axle 6c.

In this case, the secondary axle 6c is mounted so that it is orientable about a kingpin 6e on the secondary chassis 6d. The secondary chassis 6d, in this instance, is not mounted so that it can pivot in terms of direction with respect to the chassis 2 but is mounted so that it can pivot in terms of inclination under the chassis 2 about a rear transverse axis 6f.

In practice, the secondary chassis 6d is triangular with its vertex bearing the kingpin 6e and its base articulated along the rear transverse axis 6f.

The actuating means 7 are similar to those of the embodiment of FIG. 1, namely link rods or cables 7a and 7b and a crossmember 7g. Operation is similar to that of the embodiment of FIG. 1.

For movements of the secondary wheelset 6 between the retracted and deployed positions, as can be seen in FIG. 9, a motor or actuator M acts on the secondary chassis 6d to adjust its inclination about the rear transverse axis 6f. FIG. 9 illustrates the retracted position in dotted line and the deployed position in solid line.

According to an another form of the embodiment of FIGS. 8 to 10, the secondary chassis 6d may be articulated not about a rear transverse axis 6f but about the transverse axle 3c. In that way, in the case of a short trailer 1, the secondary wheels 6a and 6b can advantageously be positioned in such a way that when they are in the retracted position they lie forward of the chassis 2 on each side of the drawbar device 4. In the deployed position, the wheels 6a and 6b may lie at the same level as the main axle 3c, the secondary chassis 6d standing up vertically. In this alternative form it is preferable for the actuating means to be cables 7a and 7b which relax when the secondary wheelset 6 is in the retracted position and which are tensioned and orient the wheels 6a and 6b when the secondary wheelset 6 comes into the deployed position.

In the embodiments of FIGS. 1 to 10, the secondary wheelset 6 is "live" namely actively adopts a direction with respect to the axis of the road trailer 1, by controlled rotation about the kingpin 6e. When the kingpin 6e is a vertical pin, namely one perpendicular to the main horizontal plane of the trailer 1 and therefore generally perpendicular to the ground S, a pivoting of the secondary wheelset 6 keeps the two coaxial wheels 6a and 6b pressing equally on the ground S.

As a alternative, the kingpin 6e can be inclined forward by a few degrees so that its top is further forward than its bottom. In that way, as the secondary wheelset 6 pivots, the wheel 6a or 6b that is furthest forward drops and bears a load that is greater than that borne by the other wheel. Its grip on the ground S is therefore better and it takes the lead in the steering effect. At the same time, being positioned forward toward the towing ball amplifies the effect of the steering of the wheels 6a and 6b on the returning of the road trailer 1 into alignment with the axis of the towing vehicle 5.

Figure 11:
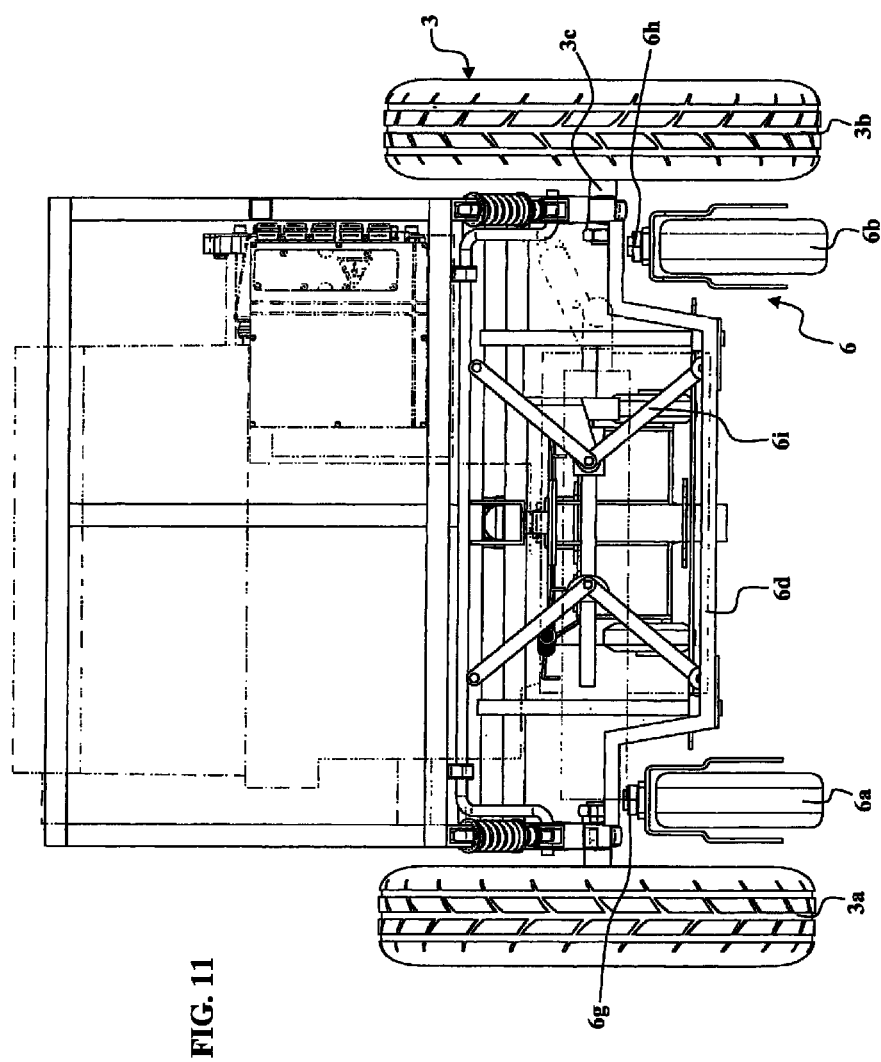
FIGS. 11 and 12 respectively illustrate, viewed from the rear and viewed schematically from the top, a trailer according to an embodiment in which the wheels of the secondary wheelset are individually orientable.
Figure 12:
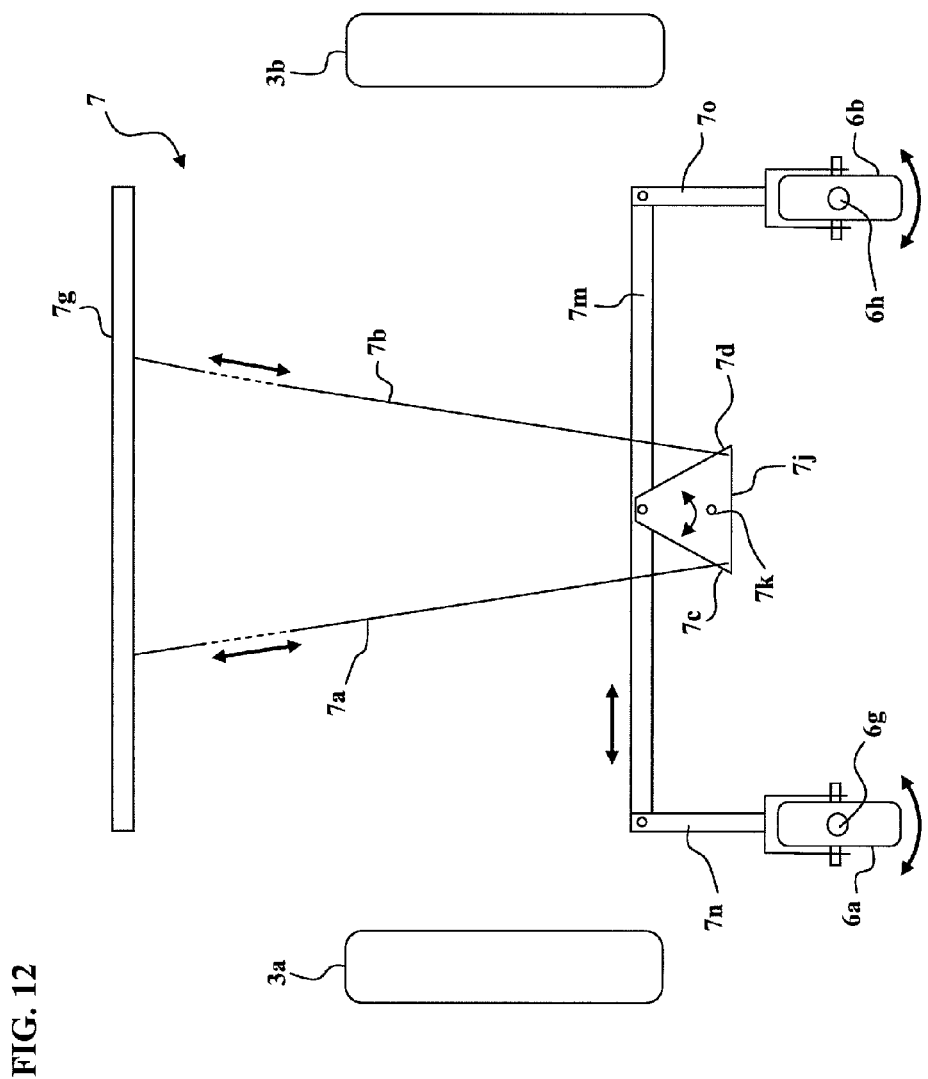

Let us now consider the embodiment illustrated in FIGS. 11 and 12.

In this embodiment we again find the same structure of trailer 1 with the chassis 2, a drawbar device fixed to the chassis 2, a main wheelset 3 with two main wheels 3a and 3b on a main axle 3c of fixed orientation.

We also again find a secondary wheelset 6, with two secondary wheels 6a and 6b.

In this case, the secondary wheels 6a and 6b are mounted so that they can be oriented individually about a respective kingpin 6g and 6h on the secondary chassis 6d. The secondary chassis 6d in this case is not mounted so that it can pivot in terms of direction with respect to the chassis 2. It can be moved toward and away from the chassis 2 through a motorized deformable parallelogram system 6i, between the deployed position illustrated in FIG. 11, and a retracted position away from the ground.

The actuating means 7 (FIG. 12) are similar to those of the embodiment of FIG. 1, namely link rods or cables 7a and 7b, and a crossmember 7g. Operation is similar to that of the embodiment of FIG. 1. However, in this case, the rear ends 7c and 7d of the cables 7a and 7b are articulated to a triangular plate 7j that can rotate about a vertical axis 7k of the secondary chassis 6d. The plate 7j acts on a transverse steering arm 7m connected by link rods 7n, 7o to the secondary wheels 6a and 6b.

Figure 13:
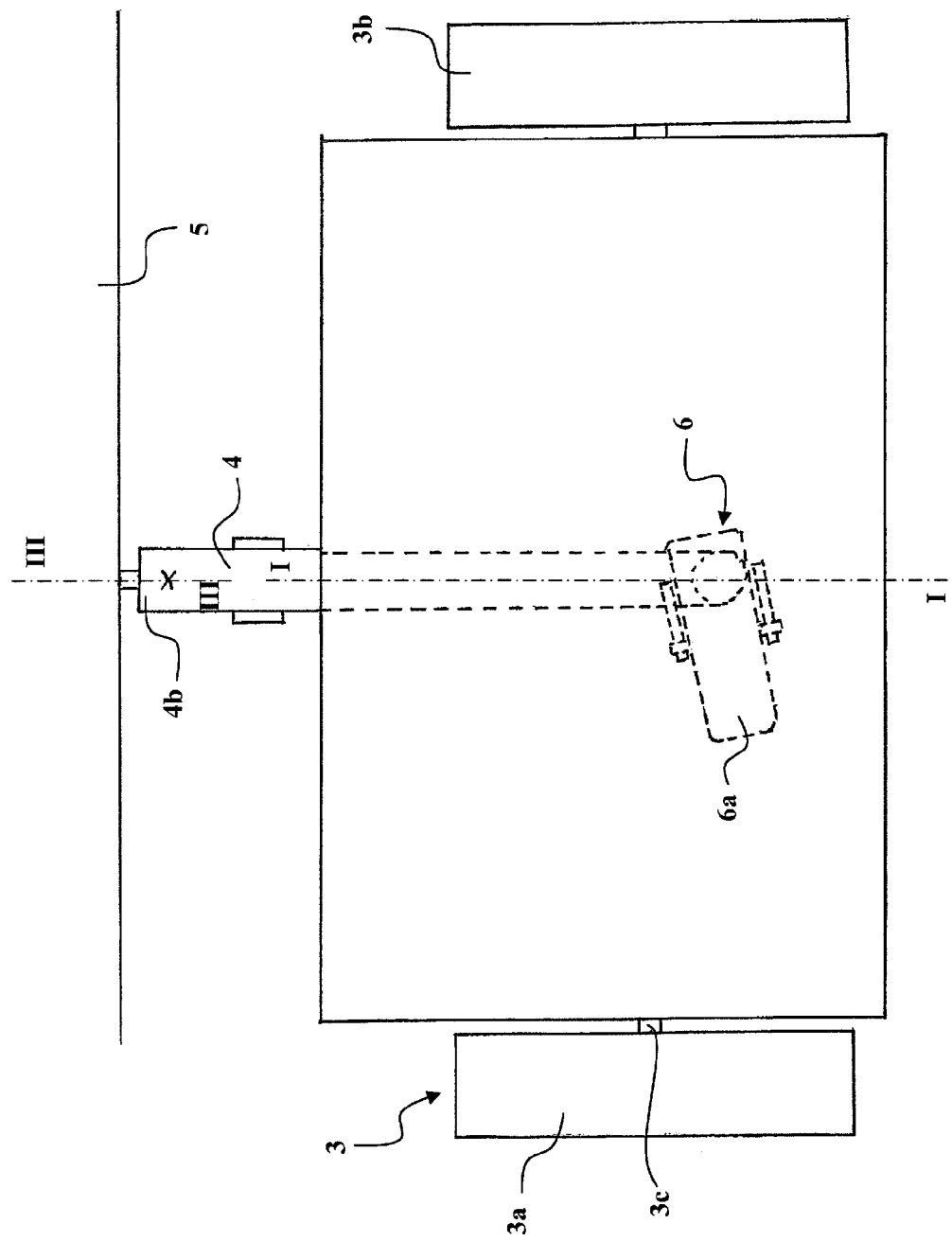
FIG. 13 schematically illustrates, in a view from above, a trailer according to a simplified embodiment of the present invention.
Figure 14:
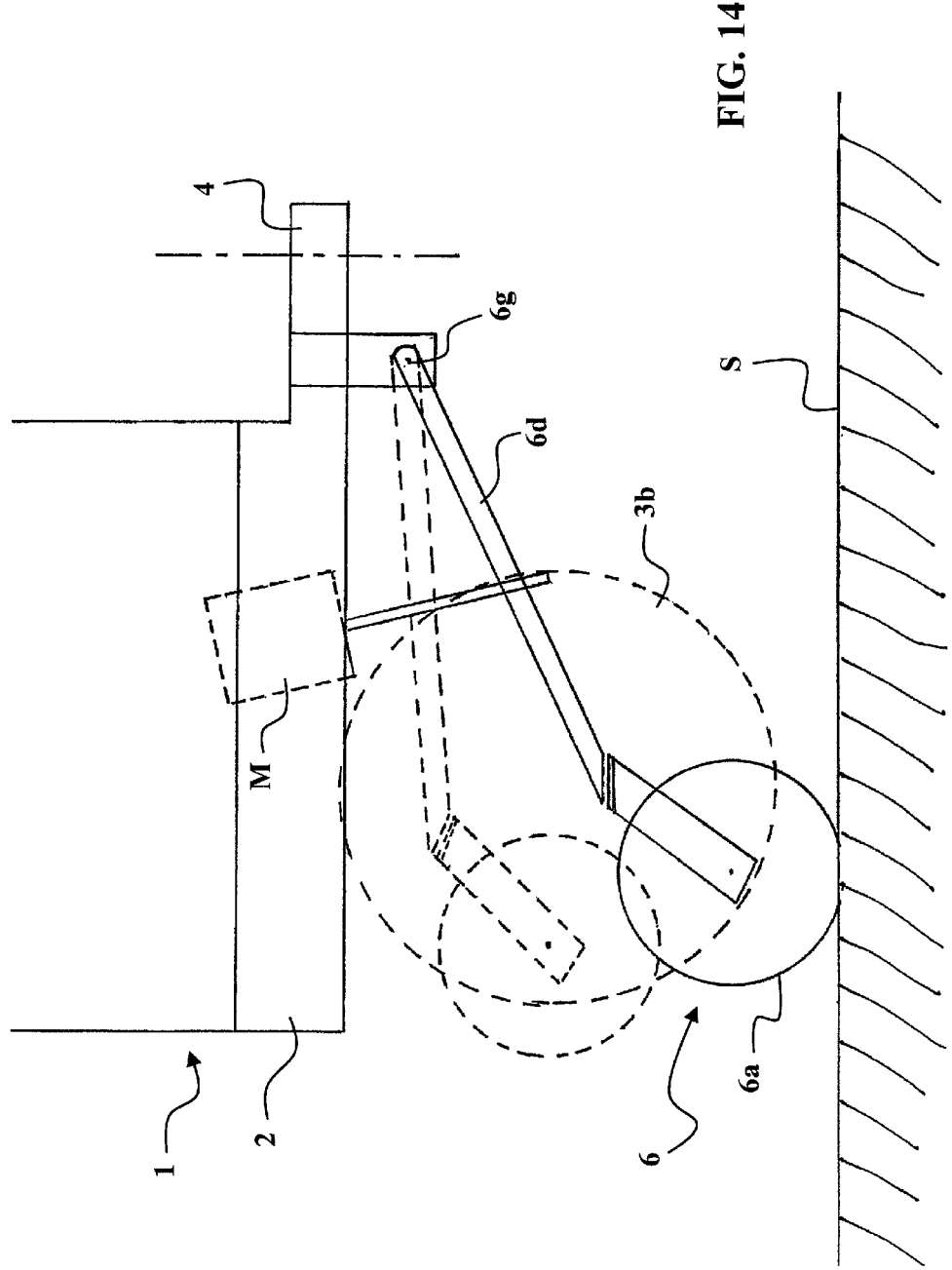
FIG. 14 illustrates in side view the trailer of FIG. 11, the secondary wheelset being in operation.

Another embodiment illustrated in FIGS. 13 and 14 is now considered.

Once again we find a trailer structure 1 similar to that of the preceding embodiments, with a chassis 2, a drawbar device 4 fixed to the chassis 2, a main wheelset 3 with two main wheels 3a and 3b which are coaxial at the end of a main axle 3c.

When the towing vehicle 5 is moving forward, the drawbar device 4 is articulated about its front end 4b to a towing ball secured to the towing vehicle 5.

We again find a secondary wheelset 6 which can adopt a retracted position illustrated in dotted line in FIG. 12, and a deployed position illustrated in solid line. In the retracted position, the trailer 1 rests on the ground S via the wheels 3a and 3b of the main wheelset 3. In the deployed position, the trailer 1 rests on the ground S via the wheels of the secondary wheelset 6.

In this embodiment, different means are provided for orienting the secondary wheelset 6 in terms of direction: on the one hand, the drawbar device 4 comprises means for limiting the angular deviation between the longitudinal direction I-I of the trailer and the longitudinal direction of the towing vehicle 5; on the other hand, the secondary wheelset 6 is made up of one (or more) self-orienting wheel(s) such as the wheel 6a, like the wheels of a supermarket shopping cart.

The self-orienting wheel 6a is mounted at the end of a secondary chassis 6d formed of a beam itself articulated about a front transverse axis 6g to the chassis 2. A motor M controls the inclination of the beam of the secondary chassis 6d in order to move the secondary wheelset 6 between the retracted and deployed positions.

In practice, the means that limit the angular deviation between the axis I-I of the trailer and the axis of the towing vehicle 5 may comprise one or more clamping jaws capable of pressing around the towing ball provided on the towing vehicle 5. In the position of moving forward, the clamping jaws are unclamped so that the drawbar device 4 is articulated freely on the towing ball, giving the trailer 1 the normal and usual road-running behavior. In the position for reversing, the jaws are clamped so as to keep the drawbar device 4 in a substantially constant orientation, maintaining a constant angular deviation between the axis I-I of the trailer 1 and the axis of the towing vehicle 5. In this case, when progressing backward, the self-orienting wheel 6a of the secondary wheelset 6 adopts the direction it needs to adopt in order to avoid transverse forces between the ground S and the trailer 1, so that the trailer 1 maintains a constant orientation with respect to the orientation of the towing vehicle 5. The user therefore need not worry about the trailer.

In the embodiments of FIGS. 1 to 12, the actuating means 7 for driving the orientation of the secondary wheelset 6 are mechanical means.

As an alternative, the secondary wheelset 6 could be oriented by a means that measures the relative distance between the two front sides of the trailer 1 and the towing vehicle 5. Distance sensors of the reversing radar type used on motor vehicles could for example be used for this purpose. The rotation of the secondary wheelset 6 is then controlled by an electric motor or by an actuator. The datum value is connected to the ratio of the distances detected by the distance sensors so that the steering angle is greater than the angle between the longitudinal axis I-I of the trailer 1 and the longitudinal axis of the towing vehicle 5, as in the case of the mechanically controlled system. If necessary, a PID regulator may be added, with a datum value for achieving equal distances between the right and left measurements.

The retraction means M, V, 6d which selectively move the secondary wheelset 6 toward and away from the ground S may adopt various forms, other than the motors M and screws V illustrated in the figures. For example, use may be made of an electric or hydraulic actuator. All that is required is for these means to lead selectively to the secondary wheelset 6 being brought into contact with the ground S while lifting the wheels 3a and 3b of the main wheelset 3 off the ground slightly and to lead selectively to the secondary wheelset 6 being retracted so that the trailer 1 rests cleanly on the main wheels 3a and 3b for forward travel.

Actuation of the retraction means M, V, 6d can be performed manually, by operating an electric switch or by using a cranking handle.

For preference, actuation of the retraction mean M, V, 6d may be automatic, controlled for example by the position of the gearshift lever of the towing vehicle 5. For this purpose, electric wires will be provided for carrying the information about the position of the gearshift lever to the control of the motor M.

As an alternative, the signal that the reversing lights have come on can be picked up from the trailer connections.

In another solution, the forward travel and reversing modes may be detected by a direction sensor mounted on the trailer 1, on a wheel, by Doppler effect, or by a general motion sensor device. However, care should be taken to ensure that there is not an excessive delay between the start of reversing and the deploying of the secondary wheelset 6.

To enhance safety of operation and prevent unwanted deployment of the secondary wheelset 6, two signals can be combined: a first signal that the reversing light has come on or that the gearshift lever is in reverse, on the one hand; and a second signal notifying absence of forward movement. The secondary wheelset 6 is lowered if, and only if, both signals are present.

Locking means, actuatable by the user, may possibly be provided to allow selective locking of the retraction means in an intermediate position so that the road trailer rests on both wheelsets in the absence of a towing vehicle.

A road trailer 1 according to the invention can be used as a load-bearing trailer, notably for carrying luggage.

According to one particularly advantageous application, a road trailer 1 according to the invention may comprise electricity generation or storage means, for example a bank of accumulator batteries or a combustion engine 10 coupled to a generator 11 (FIG. 2), which are connected to an electrically powered type of towing vehicle 5 in order to supply electrical power to the towing vehicle 5. This allows the range thereof to be extended.

In other words, the owner of a towing vehicle 5 of the electrically powered type may, if he so wishes, couple a trailer 1 carrying a generator 11 when he wishes to make a long journey. The device according to the invention will allow him to maneuver his vehicle without difficulty, both forward and backward, without having to learn tricky skills.

The present invention is not restricted to the embodiments that have been explicitly described but includes the various alternative forms and generalizations thereof which are contained in the scope of the claims that follow.

The invention claimed is:
1. Road trailer (1) provided with a trailer chassis (2), with a main wheelset (3) and with a fixed drawbar device (4) for coupling it to a towing vehicle (5), further comprising:

a secondary wheelset (6),
retraction means (M, V, 6*d*) for selectively moving, away from the ground or towards the ground at least one of the main wheelset (3) and the secondary wheelset (6), between a first position in which the secondary wheelset (6) remains away from the ground (S) when the trailer is resting on the ground (S) via the main wheelset (3), and a second position in which the main wheelset (3) remains away from the ground (S) when the trailer is resting on the ground (S) via the secondary wheelset (6),
orientation means for orienting the direction of the secondary wheelset (6) according to a reversing path of the towing vehicle (5).

2. Road trailer (1) as claimed in claim 1, wherein the main wheelset (3) is at a fixed height with respect to the chassis (2), while the retraction means (M, V, 6*d*) are designed to move the secondary wheelset (6) between a position retracted toward an upper part of the chassis (2), in which position the trailer (1) rests on the ground (S) via the main wheelset (3) whereas the secondary wheelset (6) is away from the ground (S), and a position deployed away from the upper part of the chassis (2), in which position the trailer (1) rests on the ground (S) via the secondary wheelset (6) whereas the main wheelset (3) is away from the ground (S).

3. Road trailer (1) provided with a trailer chassis (2), with a main wheelset (3) and with a fixed drawbar device (4) for coupling it to a towing vehicle (5), further comprising:
a secondary wheelset (6),
retraction means (M, V, 6*d*) for selectively moving, away from the ground or towards the ground at least one of the main wheelset (3) and the secondary wheelset (6), between a first position in which the secondary wheelset (6) remains away from the ground (S) when the trailer is resting on the ground (S) via the main wheelset (3), and a second position in which the main wheelset (3) remains away from the ground (S) when the trailer is resting on the ground (S) via the secondary wheelset (6),
orientation means for orienting the direction of the secondary wheelset (6) according to a reversing path of the towing vehicle (5),
wherein in order to orient the direction of the secondary wheelset (6):
the drawbar device (4) comprises means that limit the angular deviation between the longitudinal direction (II) of the trailer (1) and the longitudinal direction (III-III) of the towing vehicle (5),
the secondary wheelset (6) is made up of one or more self-orienting wheels (6*a*) able to follow the direction imparted to the road trailer (1) by the drawbar device (4) attached to the towing vehicle (5).

4. Road trailer (1) as claimed in claim 3, wherein the means that limit the angular deviation comprise one or more clamping jaws able to press around a towing ball provided on the towing vehicle (5).

5. Road trailer (1) as claimed in claim 3, wherein the means that limit the angular deviation comprise locking means for selectively locking the angular deviation of the drawbar device (4) with respect to the towing vehicle (5).

6. Road trailer (1) provided with a trailer chassis (2), with a main wheelset (3) and with a fixed drawbar device (4) for coupling it to a towing vehicle (5), further comprising:
a secondary wheelset (6),
retraction means (M, V, 6*d*) for selectively moving, away from the ground or towards the ground at least one of the main wheelset (3) and the secondary wheelset (6), between a first position in which the secondary wheelset (6) remains away from the ground (S) when the trailer is resting on the ground (S) via the main wheelset (3), and a second position in which the main wheelset (3) remains away from the ground (S) when the trailer is resting on the ground (S) via the secondary wheelset (6),
orientation means for orienting the direction of the secondary wheelset (6) according to a reversing path of the towing vehicle (5),
wherein in order to orient the direction of the secondary wheelset (6):
the secondary wheelset (6) is made up of wheels (6*a*, 6*b*) the direction of which can be oriented,
said orientation means have actuating means (7) which control the orientation of the orientable wheels (6*a*, 6*b*) with respect to the chassis (2) of the road trailer (1) as a function of the angular deviation (B) between the longitudinal direction (III-III) of the towing vehicle (5) and of the longitudinal direction (II) of the trailer (1).

7. Road trailer (1) as claimed in claim 6, wherein the actuating means (7) orient the wheels (6*a*, 6*b*) of the secondary wheelset (6) at a steering angle (A) that tends to bring the trailer (1) back into line with the axis (III-III) of the towing vehicle (5).

8. Road trailer (1) as claimed in claim 6, wherein the actuating means (7) comprise cables or link rods (7*a*, 7*b*) a front end (7*e*, 7*f*) of which is articulated to the towing vehicle (5) and a rear end (7*c*, 7*d*) of which is articulated to a common orientable support (6*d*) for the wheels (6*a*, 6*b*) of the secondary wheelset (6).

9. Road trailer (1) as claimed in claim 6, wherein the actuating means comprise cables or link rods (7*a*, 7*b*) of which a front end (7*e*, 7*f*) is articulated to the towing vehicle (5) and of which a rear end (7*c*, 7*d*) is articulated to a rotary plate (7*j*) operating a transverse steering arm (7*m*) connected by link rods (7*n*, 7*o*) to the wheels (6*a*, 6*b*) of the secondary wheelset (6).

10. Road trailer (1) as claimed in claim 6, comprising electricity generation or storage means (10, 11) able themselves to be connected to an electrically powered towing vehicle (5) so as to supply the towing vehicle (5) with electrical energy thus increasing the range thereof.

11. Road trailer (1) provided with a trailer chassis (2), with a main wheelset (3) and with a fixed drawbar device (4) for coupling it to a towing vehicle (5), further comprising:
a secondary wheelset (6),
retraction means (M, V, 6*d*) for selectively moving, away from the ground or towards the ground at least one of the main wheelset (3) and the secondary wheelset (6), between a first position in which the secondary wheelset (6) remains away from the ground (S) when the trailer is resting on the ground (S) via the main wheelset (3), and a second position in which the main wheelset (3) remains away from the ground (S) when the trailer is resting on the ground (S) via the secondary wheelset (6),
orientation means for orienting the direction of the secondary wheelset (6) according to a reversing path of the towing vehicle (5),
wherein the retraction means comprise:
at least one actuator (M, V) able selectively to move at least one out of the main wheelset (3) and the secondary wheelset (6),
actuator control means for actuating the actuator (M, V) and causing the trailer (1) to rest on the ground (S) via the secondary wheelset (6) alone when the towing vehicle (5) is reversing, and for actuating the actuator (M, V) and causing the trailer (1) to rest on the ground (S) by the main wheelset (3) alone when the vehicle (5) is moving forward.

12. Road trailer (1) as claimed in claim 11, comprising wheelset locking means for selectively locking the retraction means (M, V, 6d) in an intermediate position in which the main wheelset (3) and the secondary wheelset (6) are at the same level so that they simultaneously support the road trailer (1) on the ground, the main (3) and secondary (6) wheelsets being offset from one another in the longitudinal direction of the road trailer (1).

13. Use of a road trailer (1) with a towing vehicle (5),
said road trailer being provided with a trailer chassis (2), with a main wheelset (3) and with a fixed drawbar device (4) for coupling it to a towing vehicle (5), further comprising:
a secondary wheelset (6),
retraction means (M, V, 6d) for selectively moving, away from the ground or towards the ground at least one of the main wheelset (3) and the secondary wheelset (6), between a first position in which the secondary wheelset (6) remains away from the ground (S) when the trailer is resting on the ground (S) via the main wheelset (3), and a second position in which the main wheelset (3) remains away from the ground (S) when the trailer is resting on the ground (S) via the secondary wheelset (6),
orientation means for orienting the direction of the secondary wheelset (6) according to a reversing path of the towing vehicle (5), the use comprises:
operating the retraction means (M, V, 6d) in order to place the main (3) and secondary (6) wheelsets in the first position so that the road trailer (1) rests on the ground (S) via its main wheelset (3) alone when the towing vehicle (5) is moving forward, and operating the retraction means (M, V, 6d) in such a way as to place the main (3) and secondary (6) wheelsets in a second position so that the road trailer (1) rests on the ground (S) via its secondary wheelset (6) alone when the towing vehicle (5) is reversing.

14. Use as claimed in claim 13, wherein the towing vehicle (5) comprises electrical propulsion means and the road trailer (1) comprises electricity generation or storage means (10, 11) connected to the towing vehicle (5) and powering the electric propulsion means in order to increase the range of said vehicle.

* * * * *